United States Patent
Oka

(10) Patent No.: US 8,411,168 B2
(45) Date of Patent: Apr. 2, 2013

(54) IMAGING APPARATUS AND VIDEO DATA CREATING METHOD

(75) Inventor: Hidemi Oka, Hyogo (JP)

(73) Assignee: Panasonic Corporation, Osaka (JP)

( * ) Notice: Subject to any disclaimer, the term of this patent is extended or adjusted under 35 U.S.C. 154(b) by 246 days.

(21) Appl. No.: 13/119,103

(22) PCT Filed: Sep. 16, 2009

(86) PCT No.: PCT/JP2009/004655
§ 371 (c)(1),
(2), (4) Date: Mar. 15, 2011

(87) PCT Pub. No.: WO2010/032457
PCT Pub. Date: Mar. 25, 2010

(65) Prior Publication Data
US 2011/0199504 A1      Aug. 18, 2011

(30) Foreign Application Priority Data
Sep. 16, 2008   (JP) ................................. 2008-236073

(51) Int. Cl.
*H04N 5/228*     (2006.01)
*H04N 5/76*      (2006.01)
*H04N 5/77*      (2006.01)

(52) U.S. Cl. .................. 348/231.6; 348/222.1; 386/226

(58) Field of Classification Search ............... 348/222.1, 348/231.99, 231.2, 231.3, 231.6; 386/226
See application file for complete search history.

(56) References Cited

U.S. PATENT DOCUMENTS

| 5,809,454 | A | * | 9/1998 | Okada et al. ................... 704/214 |
| 6,314,139 | B1 | * | 11/2001 | Koto et al. ............... 375/240.12 |
| 6,594,213 | B1 | * | 7/2003 | Hayashi ..................... 369/47.34 |
| 7,903,947 | B2 | * | 3/2011 | Yamada et al. ................ 386/326 |
| 2003/0164984 | A1 | | 9/2003 | Suetomo et al. |
| 2006/0239563 | A1 | * | 10/2006 | Chebil et al. .................. 382/232 |
| 2008/0075164 | A1 | | 3/2008 | Matsumura |

FOREIGN PATENT DOCUMENTS

| JP | 2003-319315 | 11/2003 |
| JP | 2005-130044 | 5/2005 |
| JP | 2007-159056 | 6/2007 |
| JP | 2008-016130 | 1/2008 |
| JP | 2008-085673 | 4/2008 |

* cited by examiner

*Primary Examiner* — Daniel M Pasiewicz
(74) *Attorney, Agent, or Firm* — Hamre, Schumann, Mueller & Larson, P.C.

(57) ABSTRACT

Image data (still image data) is encoded to create video data. When an interval recording mode is set, a plurality of video data created by an encoder (image compressor 42) are merged, and the merged video data is recorded as a single interval video data. In the interval recording mode, power supply to the encoder is stopped every time an encoding process of the image data is completed. After the stop of the power supply to the encoder, the power supply to the encoder is resumed when an encoding process of the next image data needs to be performed. Continuity information is managed during the stop of the power supply to the encoder. The continuity information is necessary for creating the plurality of video data so that the interval video data constitutes a stream that can be reproduced continuously.

12 Claims, 9 Drawing Sheets

IMAGING APPARATUS AND VIDEO DATA CREATING METHOD

TECHNICAL FIELD

The present invention relates to an imaging apparatus. Particularly, the present invention relates to an imaging apparatus having functions of shooting a subject for a long period of time and recording the images obtained by the shooting at predetermined time intervals. The present invention also relates to a video data creating method that can be employed for such an imaging apparatus.

BACKGROUND ART

Conventionally, video cameras for recording video (moving image) data in recording media such as a semiconductor memory have been known. In such a video camera, video data is created according to a compression/coding standard, typified by MPEG-2 (Moving Picture Experts Group Phase 2) and H.264/AVC (Advanced Video Coding), and the created video data is recorded in a semiconductor memory.

Many video cameras of this type have various shooting functions. One of these functions is an interval recording function, in which images are recorded at predetermined time intervals so that slow-moving scenes taken over a long period of time can be reproduced as a short video. For example, JP 2007-159056 A discloses an encoding apparatus applicable to the interval recording function. According to this encoding apparatus, image data obtained within a predetermined shooting time is set as one unit of data, and inter-frame encoding is performed so that the encoding of the data is completed on a unit-by-unit basis.

CITATION LIST

Patent Literature

Patent Literature 1: JP 2007-159056 A

SUMMARY OF INVENTION

Technical Problem

Long-time shooting is desired for interval recording. Since a portable video camera is driven by a battery, the electric power consumed for shooting needs to be reduced to achieve long-time shooting. To reduce the power consumption, it is effective to suspend the operation of a part of the system, for example, an encoder, as necessary. If the operation of the encoder is suspended, however, it may not be able to create video data that can be reproduced continuously.

It is an object of the present invention to provide an imaging apparatus capable of creating video data that can be reproduced continuously even in interval recording. It is a further object of the present invention to provide a video data creating method that can be employed for the imaging apparatus.

Solution to Problem

The present invention provides an imaging apparatus including:
an imaging section configured to pick up an image of a subject;
an image generator configured to process an output of the imaging section to generate processed image data;
an encoder configured to encode the image data to create video data;
a recording mode setting section configured to set a recording mode of the imaging apparatus to an interval recording mode, in which a frequency at which one unit of the video data is created per unit time is lower than a frequency in an ordinary recording mode;
a recording control section configured to merge a plurality of the video data created by the encoder, and to record the merged video data as a single interval video data, in the interval recording mode;
a power supply control section configured to stop supplying power to the encoder every time an encoding process of the image data is completed, and to resume supplying power to the encoder when an encoding process of the next image data needs to be performed, in the interval recording mode; and
a continuity information management section configured to manage continuity information during the stop of the power supply to the encoder, the continuity information being necessary for creating the plurality of the video data so that the interval video data constitutes a stream that can be reproduced continuously.

In another aspect, the present invention provides a video data creating method including the steps of:
picking up an image of a subject to generate image data;
encoding the image data to create video data;
merging a plurality of the video data created by an encoder configured to encode the image data, and recording the merged video data as a single interval video data, when an interval recording mode, in which a frequency at which one unit of the video data is created per unit time is lower than a frequency in an ordinary recording mode, is set as an operation mode of the encoder;
stopping supplying power to the encoder every time an encoding process of the image data is completed, in the interval recording mode;
resuming supplying power to the encoder when an encoding process of the next image data needs to be performed, after the stop of the power supply to the encoder; and
managing continuity information during the stop of the power supply to the encoder, the continuity information being necessary for creating the plurality of the video data so that the interval video data constitutes a stream that can be reproduced continuously.

Advantageous Effects of Invention

According to the present invention, during the stop of the power supply to the encoder, the continuity information, which is necessary for creating the plurality of the video data so that the interval video data constitutes a stream that can be reproduced continuously, is managed for the encoder. After the resumption of the power supply, the encoder can reflect the referred continuity information in the next encoding process, that is, the creation of the next video data. As a result, an interval video data that can be reproduced continuously is created.

In the present description, "(en)coding" and "decoding" are used in the same meaning as "compression" and "decompression" respectively.

DESCRIPTION OF EMBODIMENTS

Figure 1:
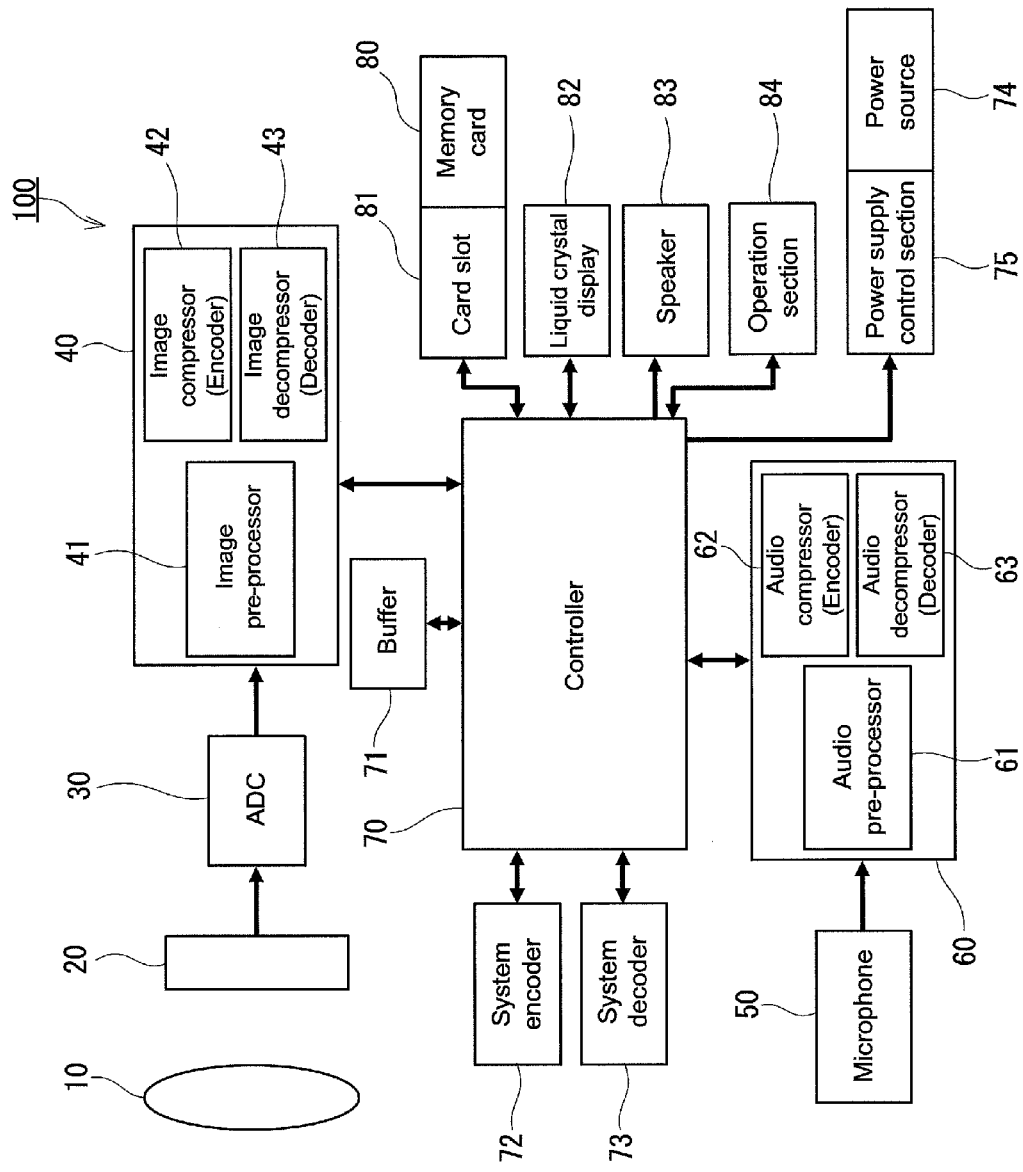
FIG. 1 is a block diagram showing a configuration of an imaging apparatus according to a first embodiment of the present invention.

As known by persons skilled in the art, an encoder generates an encoded bit stream (i.e., a stream of image data) to prevent a decoder for decoding the bit stream from falling into a failure state. Taking a video camera as an example, a bit stream generated by an encoder is stored in a storage medium such as a memory card. The bit stream to be reproduced is read out from the storage medium and inputted into a decoder buffer. The decoder takes the bit stream out of the buffer and decodes it so as to reproduce the images. In this reproduction process, if the decoder buffer overflows or underflows, the decoder may not be able to decode the bit stream correctly. In order to prevent this problem, the encoder needs to encode the bit stream so that the decoder buffer does not underflow or overflow. In order to meet this need, a concept of a "hypothetical decoder" has been introduced into the MPEG-2 and H.264/AVC standards. A "hypothetical decoder" is a hypothetical model of the behavior of a decoder, that is, the state of the decoder buffer. The encoder needs to generate a bit stream so that this hypothetical decoder does not fall into a failure state.

When the encoder is in a continuous operation state, the encoder itself always can keep track of the state of the hypothetical decoder. Therefore, the encoder can create continuously video data capable of avoiding the failure of the buffer. However, when the operation of the encoder is suspended for the purpose of reducing power consumption, the continuity of the hypothetical decoder is broken, which requires some measures to be taken to create appropriate video data.

To meet such a requirement, one embodiment can be proposed. Specifically, the encoder is configured to encode image data while simulating a buffer occupancy level of a hypothetical decoder, which is a hypothetical model of a decoder buffer of an imaging apparatus including the encoder itself or another reproducing apparatus, so as to create video data capable of avoiding underflow of the decoder buffer during reproduction of the video data. The continuity information includes information for identifying the buffer occupancy level obtained at the completion of the immediately preceding encoding process. The encoder refers to the continuity information after the resumption of the power supply so as to perform a new encoding process by using, as a reference, the buffer occupancy level obtained at the completion of the immediately preceding encoding process.

With the above-mentioned configuration, during the stop of the power supply to the encoder, the buffer occupancy level of the hypothetical decoder is managed for the encoder so that the continuity information can be provided to the encoder after the resumption of the power supply. Since the encoder refers to the continuity information after the resumption of the power supply, it can identify the buffer occupancy level of the hypothetical decoder obtained at the completion of the immediately preceding encoding process, and perform a new encoding process by using the identified buffer occupancy level as a reference. In this way, an appropriately encoded bit stream can be created to prevent the failure of the decoder buffer of the reproducing apparatus even when the stop and resumption of the power supply to the encoder are repeated.

Hereinafter, embodiments of the present invention will be described in detail with reference to the accompanying drawings.

(First Embodiment)
1. Configuration

FIG. 1 is a block diagram showing a configuration of an imaging apparatus according to a first embodiment of the present invention, and more specifically showing a configuration of a video camera. A video camera 100 includes an optical system 10, an imaging device 20, an ADC (Analog-Digital Converter) 30, an image processor 40, a controller 70, a buffer 71, a microphone 50, an audio processor 60, a system encoder 72, a system decoder 73, a card slot 81, a liquid crystal display 82, a speaker 83, an operation section 84, and a power supply control section 75. Not all of these components are essential to the present invention. FIG. 1 merely shows a typical configuration of the video camera 100. Hereinafter, the configuration of the video camera 100 will be described in detail.

The optical system 10 includes, for example, an objective lens, a zoom lens, an aperture, an OIS unit (Optical Image Stabilizer Unit), and a focus lens. The optical system 10 collects light from a subject to form the image of the subject. An imaging device 20 picks up the image of the subject formed by the optical system 10 to generate image data. The imaging device 20 is constituted, typically, of a CMOS (Complementary Metal-Oxide Semiconductor) image sensor or a CCD (Charge-Coupled Device) image sensor. The ADC 30 converts the image data generated by the imaging device 20 into digital signals. The optical system 10, the imaging device 20, and the ADC 30 constitute an imaging section that generates image data.

The image processor 40 performs various processes on the image data converted by the ADC 30. The image processor 40 generates, from the image data generated by the above imaging section, image data to be inputted into the system encoder 72 and image data to be displayed on the liquid crystal display 82. The image processor 40 also processes the image data outputted from the system decoder 73 so as to generate image data to be displayed on the liquid crystal display 82 and image data to be inputted again into the system encoder 72. The image processor 40 can be constituted of a DSP (Digital Signal Processor) or a micro computer.

More specifically, the image processor 40 includes an image pre-processor 41, an image compressor 42, and an image decompressor 43. The image pre-processor 41 performs various image processes, such as a gamma correction and a white balance correction, on the image data converted into digital signals by the ADC 30 so as to generate the processed image data.

The image compressor (encoder) 42 compresses the image data using a technique such as discrete cosine transform, Huffman coding (variable length coding), and inter-frame prediction. The image compressor 42 is capable of compressing both video data and still image data. Examples of video data compression standards include MPEG-2 and H.264/AVC. Examples of still image data compression standards include JPEG (Joint Photographic Experts Group) and GIF (Graphics Interchange Format).

For example, when the encoded image data outputted from the system decoder 73 is reproduced on the liquid crystal display 82, the image decompressor (decoder) 43 decodes this image data into an uncompressed format.

The microphone 50 collects sound to generate audio data. The microphone 50 may be composed of a plurality of microphones in order to receive the inputs for stereo sound and multi-channel sound.

The audio processor 60 performs various processes on the audio data generated by the microphone 50. The audio processor 60 generates audio data to be inputted into the system encoder 72 and audio data to be outputted to the speaker 83. The audio processor 60 performs an audio process on the audio data to be outputted from the system decoder 73 so as to generate audio data to be outputted to the speaker 83 and audio data to be inputted again into the system encoder 72. The audio processor 60 can be constituted of DSP or a micro computer.

More specifically, the audio processor 60 includes an audio pre-processor 61, an audio compressor 62, and an audio decompressor 63. The audio pre-processor 61 converts analog audio data collected by the microphone 50 into digital audio data signals. The audio pre-processor 61 also performs various audio processes such as generation of stereo sound and multi-channel sound.

The audio compressor (encoder) 62 encodes the audio data according to a known compression standard typified by MP3 (MPEG-1 Audio Layer 3) and AAC (Advanced Audio Coding).

When the encoded audio data outputted from the system decoder 73 is outputted through the speaker 83, the audio decompressor (decoder) 63 decodes this audio data.

The system encoder 72 multiplexes the encoded image data outputted from the image processor 40 and the encoded audio data outputted from the audio processor 60 so as to generate AV data (Audio and Visual Data) to be recorded in the memory card 80.

The system decoder 73 decodes the AV data recorded in the memory card 80 to generate encoded image data and encoded audio data. The system decoder 73 also outputs the generated encoded image data to the image decompressor 43, and the generated encoded audio data to the audio decompressor 63, respectively.

The controller 70 controls the entire video camera 110. The controller 70 serves as a recording control section that merges a plurality of video data created by the image compressor 42 during the interval recording and records the merged video data as a single video data that can be reproduced continuously. The functions to be provided by the controller 70 can be achieved by a combination of hardware such as a DSP and software including a control program to be executed by the hardware. The ADC 30, the image processor 40, the audio processor 60, the controller 70, the buffer 71, the system encoder 72, and the system decoder 73 may be formed as a single system LSI (Large-Scale Integration) chip designed exclusively therefor.

The buffer 71 can be constituted, for example, of a DRAM (Dynamic Random Access Memory), a ferroelectric memory, or a magnetic memory. The buffer 71 not only functions as a working memory for the controller 70, but also is used for various purposes. For example, the buffer 71 serves to store temporarily and manage the image data generated by the image processor 40 and various information, as necessary.

The controller 70 can access, via the card slot 81, the memory card 80 inserted in the card slot 81. The memory card 80 is constituted of a non-volatile memory, such as a flash memory, a ferroelectric memory, or a magnetic memory. Various types of data, such as AV data, audio data, and image data, can be stored in the memory card 80. Instead of the memory card 80 or in addition to the memory card 80, a hard disk drive and/or an embedded memory may be provided as a storage medium for storing various types of data.

The liquid crystal display 82 is a display section that displays images based on the image data generated by the imaging device 20 as well as images based on the image data in the AV data read out from the memory card 80. In addition, the liquid crystal display 82 can display various setting information and shooting time duration of the video camera 100.

The speaker 83 can output sound based on the audio data collected by the microphone 50 and sound based on the audio data in the AV data read out from the memory card 80.

The power source 74 is a battery in a portable video camera. The power source 74 is not limited to a battery, and may be an AC power source. The power supply control section 75 is constituted of, for example, a power supply circuit, a reset circuit, and a clock circuit. The power supply control section 75 serves to supply clocks and electric power to respective blocks according to an instruction from the controller 70.

The operation section 84 is a component including various operational means, which are referred to as the operation section collectively. The operation section 84 serves to receive commands from a user and transmit the commands to the controller 70. A part of the operation section 84 may be constituted of a touch screen using the liquid crystal display 82.

In the present embodiment, the operation section 84 includes a recording mode setting section. The recording mode setting section is an operation section for the user to set the recording mode for the shooting to an ordinary recording mode or an interval recording mode. The interval recording mode is a recording mode in which a frequency at which one unit of video data is created per unit time is lower than a frequency in the ordinary recording mode. For example, in the case where 24 frame pictures are captured per second in the ordinary recording mode to create one unit of video data using a group of 12 frame pictures (1 GOP: Group of Pictures), two units of video data are created per second.

Figure 2:
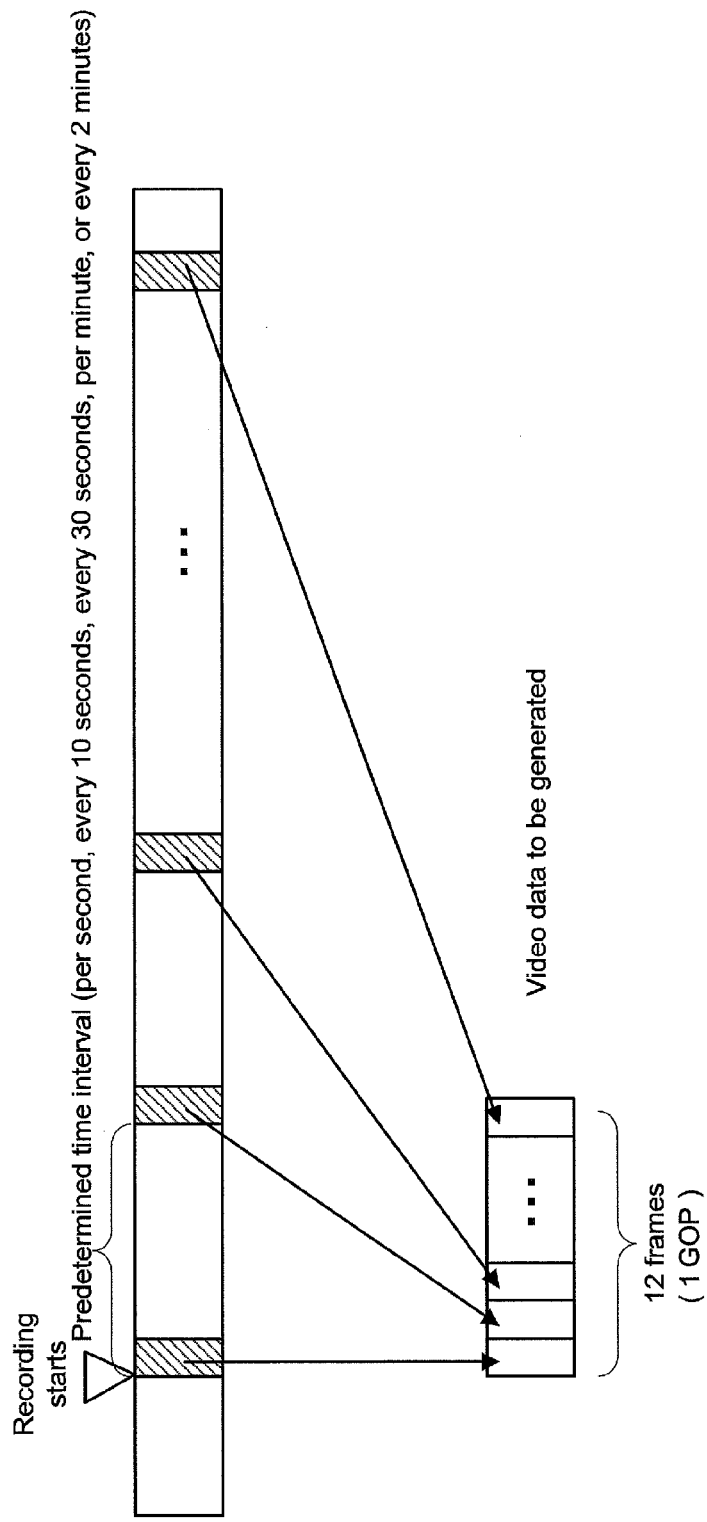
FIG. 2 is a schematic diagram showing a video data creating method in an interval recording mode.

On the other hand, in the interval recording mode, pictures are captured at longer intervals, as shown in FIG. 2. For example, one frame picture is captured per second, every 10 seconds, every 30 seconds, per minute, or every 2 minutes. Then, one unit of video data is created using 12 frame pictures in the same manner as in the ordinary recording mode. When one frame picture is captured per second, one unit of video data is created every 12 seconds. A plurality of video data thus created eventually are treated as a single interval video data that can be reproduced continuously. In this way, slow-moving scenes taken over a long period of time can be reproduced as a short video.

There is another option, as described in JP 2007-159056 A, in which a plurality of frame pictures are captured at the same rate as in the ordinary recording mode and encoded, and nothing is done until the time of capturing the next plurality of frame pictures. That is, a plurality of video data created at short time intervals also may be merged to generate a single interval video data. However, when pictures are captured at regular intervals as in the present embodiment, the resulting video provides visually smoother motion.

The image compressor 42 encodes the image data while simulating a buffer occupancy level of a hypothetical decoder, which is a hypothetical model of a decoder buffer of the video camera 100 or another reproducing apparatus. As a result, the video data capable of avoiding underflow of the decoder buffer during reproduction of the video data is created. This is true in both of the ordinary recording mode and the interval recording mode. A hypothetical decoder model provided by MPEG-2 is called a video buffer verifier (VBV). A hypothetical decoder model provided by H.264/AVC is called a hypothetical reference decoder (HRD).

Figure 3:
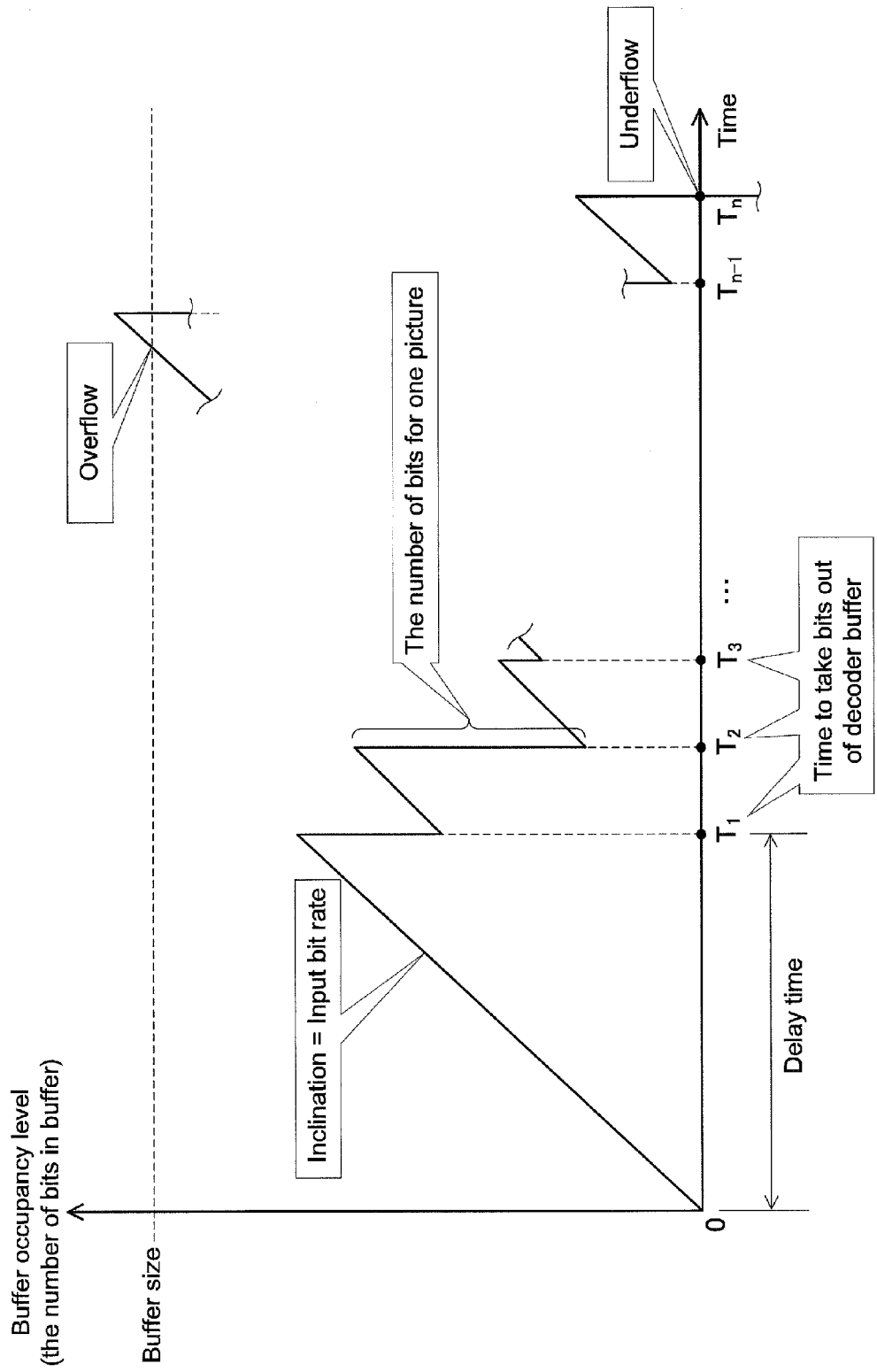
FIG. 3 is a schematic diagram of a buffer occupancy level of a hypothetical decoder simulated by an encoder (image compressor) in an encoding process.

FIG. 3 is a schematic diagram of the buffer occupancy level of a hypothetical decoder simulated by the encoder (corresponding to the image compressor 42 in the present embodiment) in the encoding process. In FIG. 3, the vertical axis represents the buffer occupancy level of the hypothetical decoder, in other words, the number of bits in the buffer. The horizontal axis represents time. A "buffer size" is the size of the decoder buffer required to reproduce video. "Delay time" is the information for notifying the decoder of the reproducing apparatus of the duration of time during which the decoder has to wait until the end of the duration after the input of the bit stream into the buffer is started. The "buffer size" and the "delay time" are the values defined by the standard, and are described in the bit stream by the encoder. Specifically, the "buffer size" and the "delay time" usually are described in various headers in the bit stream so that the decoder of the reproducing apparatus can recognize them. In the various headers in the bit stream, various information, such as the "input bit rate" and the "time to take bits out of the buffer" shown in FIG. 3, are described, in addition to the information essential for the decoder to decode the stream, such as motion vector information and picture types.

As shown in FIG. 3, the bit stream is inputted into an empty buffer of a hypothetical decoder at a predetermined bit rate. After a delay time has passed, the bits corresponding to one picture are taken out of the buffer instantaneously and decoded by the hypothetical decoder instantaneously. When the bits are taken out of the buffer, the number of bits in the buffer is reduced. Then, bits are accumulated at the predetermined bit rate until the next bit taking-out time. When the bits corresponding to one picture have not yet been accumulated in the buffer at the next bit taking-out time, the buffer "underflows". That is, since there is a shortage of bits to be taken out by the decoder, the decoder waits until sufficient number of bits are accumulated. As a result, problems such as frame dropping occur. On the other hand, when the bits of the inputted bit stream exceeds the buffer size, the buffer "overflows". Since the bits exceeding the physical capacity of the buffer cannot be accumulated therein, problems such as frame dropping also may occur in this case.

The image compressor 42 encodes the image data while simulating the buffer occupancy level of the hypothetical decoder, so as to create the video data capable of avoiding underflow and overflow of the decoder buffer during the reproduction of the video data. For example, when the number of bits accumulated in the buffer is too small or too large at a bit taking-out time, the encoder adjusts the quantization parameters used for quantization of the image data so as to increase or decrease the number of bits corresponding to one picture (or one slice). The video data is thus created, so that the number of bits in the buffer always can be kept within the range between the empty state (=0) and the full state corresponding to the upper limit of the buffer size.

When the input bit rate into the buffer is variable as in a reproducing apparatus of a DVD (Digital Versatile Disc), it is only necessary to avoid underflow. In some reproducing apparatuses, however, the input bit rates may be constant. Therefore, it is desirable to create video data capable of avoiding both underflow and overflow. When the input bit rate into the buffer is constant as in television broadcasting, it is necessary to create video data capable of avoiding both underflow and overflow.

The hypothetical buffer model shown in FIG. 3 merely represents the recording of the video data in the ordinary recording mode. On the other hand, in the present embodiment, power supply to the image compressor 42 is stopped or resumed, as necessary, to reduce the power consumption in the interval recording mode. That is, the operation of the image compressor 42 is suspended even in the process of creating the video data that can be reproduced continuously. When the image compressor 42 is in a continuous operation state, the image compressor 42 itself always can keep track of the state of the hypothetical decoder. Therefore, the image compressor 42 can create continuously video data capable of avoiding the failure of the buffer.

Figure 4:
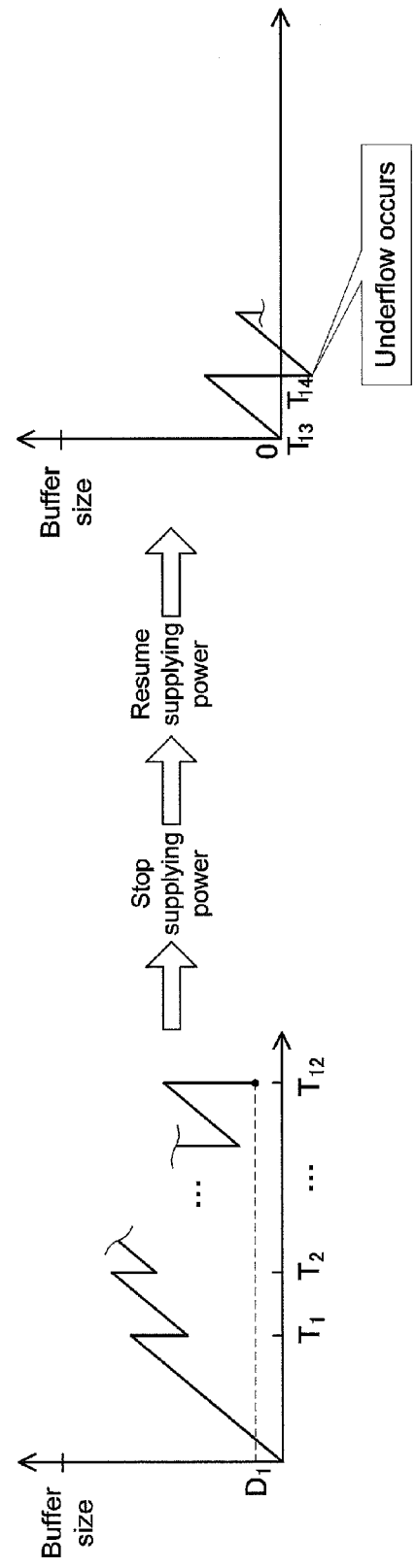
FIG. 4 is a schematic diagram showing a problem that arises when the buffer occupancy level obtained before the stop of power supply is not carried over to an encoding process to be performed after the stop of the power supply.

As shown in FIG. 4, however, if the operation of the image compressor 42 is suspended (power supply thereto is stopped) between an encoding process and the next encoding process, the image compressor 42 loses track of the buffer occupancy level obtained at the completion of the immediately preceding encoding process. As a result, the continuity of the hypothetical decoder is broken. If the continuity of the hypothetical decoder is ignored to create interval video data, the buffer may be caused to fail (underflow and/or overflow) during the reproduction of the video data. For example, assume that an encoding process is performed on the premise of the initial delay, though the number of bits in the buffer is $D_1$, which indicates that the bits are almost running out, and, in view of the value $D_1$, adjustments such as an increase of the compression ratio must be made in the next encoding process. As a result, interval video data causing underflow during the reproduction thereof is created.

Figure 5:
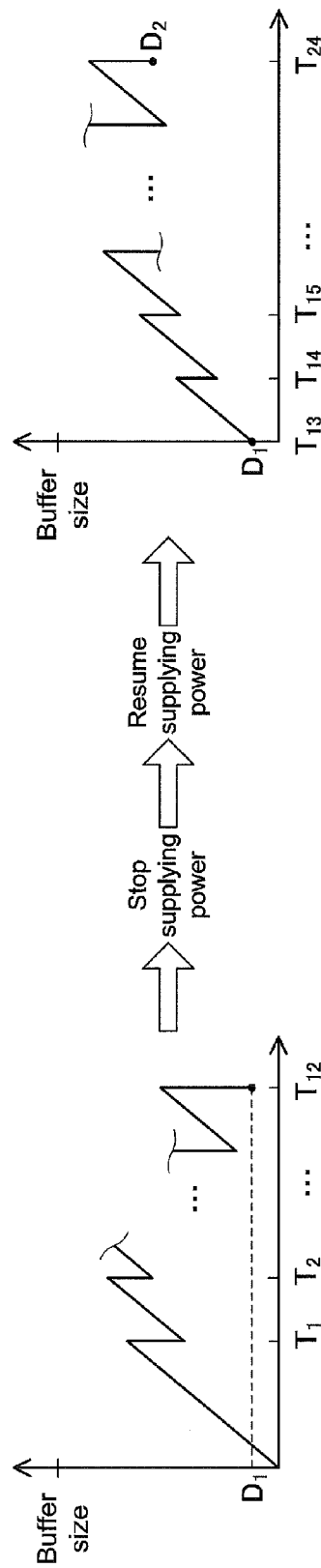
FIG. 5 is a schematic diagram showing that the problem shown in FIG. 4 can be solved by the present embodiment.

In contrast, as shown in FIG. 5, when the buffer occupancy level (the number of bits $D_1$) obtained at the completion of the immediately preceding encoding process is managed during the stop of the power supply to the image compressor 42 so that the image compressor 42 can refer to the buffer occupancy level after the resumption of the power supply thereto, the image compressor 42 can perform a new encoding process by using, as a reference, the buffer occupancy level (point $D_1$) to which it refers. Since the buffer occupancy level obtained at the completion of the immediately preceding encoding process is carried over to the next encoding process, that is, the continuity of the hypothetical decoder is maintained, appropriate interval video data that does not cause a failure of the buffer during the reproduction thereof can be created.

In the present embodiment, the "continuity information" is used as the information necessary for creating a plurality of video data so that the interval video data constitutes a stream that can be reproduced continuously. As stated herein, the "data that can be reproduced continuously" means the data that does not cause a failure of the buffer of the reproducing apparatus during reproduction thereof.

The continuity information includes, simply speaking, information for identifying the buffer occupancy level obtained at the completion of the immediately preceding encoding process. The continuity information can be stored in the buffer 71, the memory card 80, or a non-volatile embedded memory (not shown). The buffer 71, the memory card 80, or the embedded memory serves as a continuity information management section that manages the continuity information during the stop of the power supply to the image compressor 42. The continuity information further may include a time stamp. The "time stamp" is the information for identifying the decoding time of the bit stream of the interval video data. In other words, the "bit taking-out time" shown in FIG. 3 corresponds to the time stamp. With this time stamp, the interval video data that can be reproduced without delay can be created.

The buffer occupancy level of the hypothetical decoder included in the continuity information is not included in the interval video data. The buffer occupancy level included in the continuity information is merely the information that is created temporarily during interval recording. On the other hand, the time stamp is the information that should be described in the interval video data, and it is described in each frame header of the stream by the image compressor 42 when it creates the video data.

2. Operation

Figure 6:
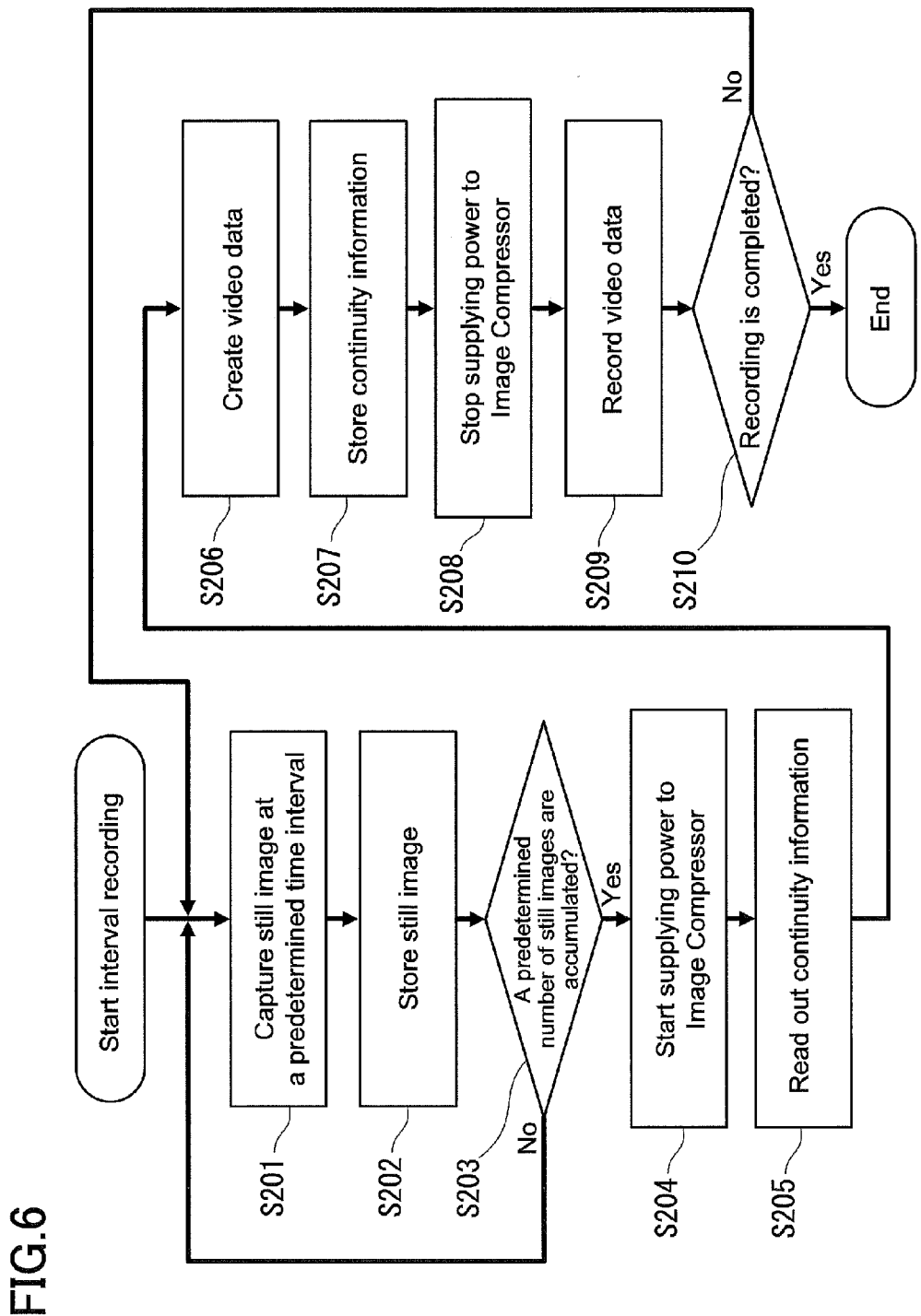
FIG. 6 is a flow chart of processes performed in the interval recording mode.

Next, with reference to the flow chart in FIG. 6, the processes performed in the interval recording mode are described. The controller 70 performs the processes shown in FIG. 6 in response to receiving a trigger to start interval recording. The start trigger occurs, for example, when a user performs an operation to start interval recording. Specifically, the interval recording is started in response to an input operation for starting the recording when the interval recording mode is set as a recording mode of the video camera 100. Alternately, an operation button for starting interval recording may be provided on the operation section 84 to start the interval recording in response to the turning-on of the operation button.

The controller 70 captures the image data generated by the image pre-processor 41 in the form of still image data from the image generator 41 at a predetermined time interval (Step S201). The user can set the interval for capturing the still image data (the predetermined time interval) using the operation section 84. The set time interval is stored in the buffer 71 or an embedded memory not shown.

The controller 70 stores the captured still image data temporarily in the buffer 71 (Step S202). The buffer 71 functions as a memory capable of storing the image data generated by the image generator 41. In Steps S201 and S202, power supply to the image compressor 42 is stopped. The still image data also may be stored in the memory card 80 that is removable from the card slot 81 of the video camera 100, instead of the buffer 71. The memory card 80 has a much larger capacity than the buffer 71. Therefore, when the memory card 80 is used, there is no need to worry about the storage capacity. When a storage medium such as an embedded memory or a hard disk drive is provided, the still image data may be stored in the storage medium temporarily.

Next, the controller 70 checks the number of time-series still image data accumulated in the buffer 71 (Step S203). When a predetermined number of still image data has not yet been accumulated, the controller 70 continues to capture the still image data. When the predetermined number of still image data has been accumulated, the controller 70 instructs the power supply control section 75 to start (to "resume" in the second and the following supplies) supplying power to the image compressor 42. Upon receiving the instruction from the controller 70, the power supply control section 75 starts supplying power to the image compressor 42 (Step S204). More specifically, the power supply control section 75 executes power controls such as clock supply to the image compressor 42 and reset the cancellation thereof. Generally, when clock supply to a non-operating circuit block is stopped, the entire power consumption decreases certainly. This is because when the clock supply is interrupted, only a static leakage current flows through the circuit block and the power consumed in the circuit block is minimized. Since a particularly large amount of power is consumed in the image compressor 42 that performs an encoding process, it can be expected that the stop of the power supply (the interruption of the clock supply) to the image compressor 42 reduces the power consumption sufficiently.

Instead of having automatic counting of the number of still image data and automatic power control by the controller 70, the user may perform an operation to execute the power control, followed by the start of the creation of the video data.

After the resumption of the power supply to the image compressor 42, the controller 70 instructs the image compressor 42 to read out the continuity information (Step S205). The image compressor 42 checks whether the continuity information is present in the buffer 71 (the continuity information management section). When the continuity information is present, the image compressor 42 reads it out. When the continuity information is not present, the image compressor 42 performs the next process without reading out the information. As understood from the description of FIGS. 3 to 5, when no encoding process (Step S206) has been performed after the start of interval recording, the continuity information is not yet present. It is after the end of the first encoding process that new continuity information is created and stored in the buffer 71 for the first time.

Next, the controller 70 instructs the image compressor 42 to create video data (Step S206). The image compressor 42 obtains, from the buffer 71, the time-series still image data as the image data to be encoded, and encodes the obtained still image data so as to create one unit of video data. The encoding process can be performed according to the MPEG-2 or H.264/AVC standard. The motion JPEG standard also can be used in some cases.

As described with reference to FIG. 2, when a predetermined number of still image data (12 frames in the present embodiment) are accumulated, the image compressor 42 encodes these still image data to generate video data. For example, when the still image data is captured at a 2-minute interval, 12 frames of still image data are accumulated in the buffer 71 in 24-minute periods. Therefore, the video data may be created at a 24-minute interval. When the encoding process is performed at a frame rate of 24 fps (Frame Per Second), video data that can be reproduced in about 0.5 second can be obtained by encoding 12 frames of still image data.

When the creation of the video data is completed, the controller 70 instructs the image compressor 42 to store, as the continuity information, the time stamp and the buffer occupancy level of the hypothetical decoder recognized by the image compressor 42 at that time, in the buffer 71 or to update the continuity information (Step S207). As shown in FIG. 5, the buffer occupancy level (the number of bits $D_1$) obtained at the completion of the immediately preceding encoding process usually is different from the buffer occupancy level (the number of bits $D_2$) obtained at the completion of the following encoding process. Therefore, the continuity information is updated every time the encoding process is completed.

When the creation of the video data is completed, the controller 70 further instructs the power supply control section 75 to stop supplying power to the image compressor 42 (Step S208). The power supply control section 75 stops supplying clocks to a circuit block that constitutes the image compressor 42 so as to stop supplying power thereto. In this way, in the interval recording mode, the power supply control section 75 stops supplying power to the image compressor 42 every time the encoding process of the image data is completed, and resumes supplying power to the image compressor 42 when the encoding process of the next image data needs to be performed. As a result, the power consumption can be reduced sufficiently.

Next, the controller 70 records the created video data in the memory card 80 (Step S209). When video data that has been created previously during the current interval recording is present in the memory card 80, the previously created video data and the video data to be recorded newly are merged so that a single interval video data that can be reproduced continuously is created. These video data are created by the image compressor 42 while ensuring the continuity of the hypothetical decoder. Therefore, even if these data are merged into a single video data, the resulting video data does not cause the failure of the buffer of the reproducing apparatus. Specifically, the controller 70 performs a process of appending the new video data to the sequence of the preceding video data and a process of modifying the end code of the sequence.

Finally, the controller 70 judges whether or not the end condition of the interval recording has been satisfied successfully (Step S210). Specifically, the controller 70 judges whether or not the user has performed the end operation of the interval recording. In the case where the interval recording is to be continued, the processes from Step S201 to Step S209 are repeated. A preset elapsed time of interval recording may be used as the end condition of the interval recording. That is, the time elapsed from the start of the interval recording is measured, and when it reaches the preset elapsed time of interval recording, the interval recording may be terminated.

According to the present embodiment, the stop and resumption of power supply to the image compressor 42 is repeated. However, when the power supply is resumed, the image compressor 42 refers to the continuity information to recognize the latest buffer occupancy level of the hypothetical decoder, so that it can perform the next encoding process by using the recognized buffer occupancy level as a reference. There is no difference between the interval video data obtained by merging the plurality of video data created in this way and the video data created in the ordinary recording mode. Furthermore, the created interval video data is managed as a single file, which does not cause a problem of taking a long time to retrieve AV data from a large number of AV data recorded in the memory card 80.

In the present embodiment, attention is focused only on video data, but the present invention is not limited to this. For example, the data to be recorded in the memory card 80 in the interval recording mode may be multiplexed interval AV data. Specifically, the video data created by the image compressor 42 is multiplexed with audio data by the system encoder 72 (for example, an MPEG-2 system) and recorded in the memory card 80. Audio data is not absolutely necessary for a stream, but when the stream does not include the audio data, it may not be able to be reproduced in some reproducing apparatuses. Therefore, it is preferable to create interval AV data using some kind of audio data. Any kind of audio data can be used. For example, audio data collected by the microphone 50 and generated by the audio processor 60, and silent audio data can be used. Alternatively, music data prepared previously by the user in the embedded memory, the hard disk drive, the memory card 80, etc. of the video camera 100 may be used to create interval AV data. In this case, there is an advantage that multiplexing can be performed freely so that the original music is not interrupted during the reproduction of the interval AV data.

Since the configurations of the video cameras according to the second to fourth embodiments below are the same as the configuration according to the first embodiment, the description thereof is omitted. In the second to fourth embodiments, the interval video data is created in a slightly different manner from the first embodiment. All the configurations and methods described in the first embodiment can of course be combined with those of the second to fourth embodiments, as long as such a combination does not cause a technical contradiction.

(Second Embodiment)

Figure 7:
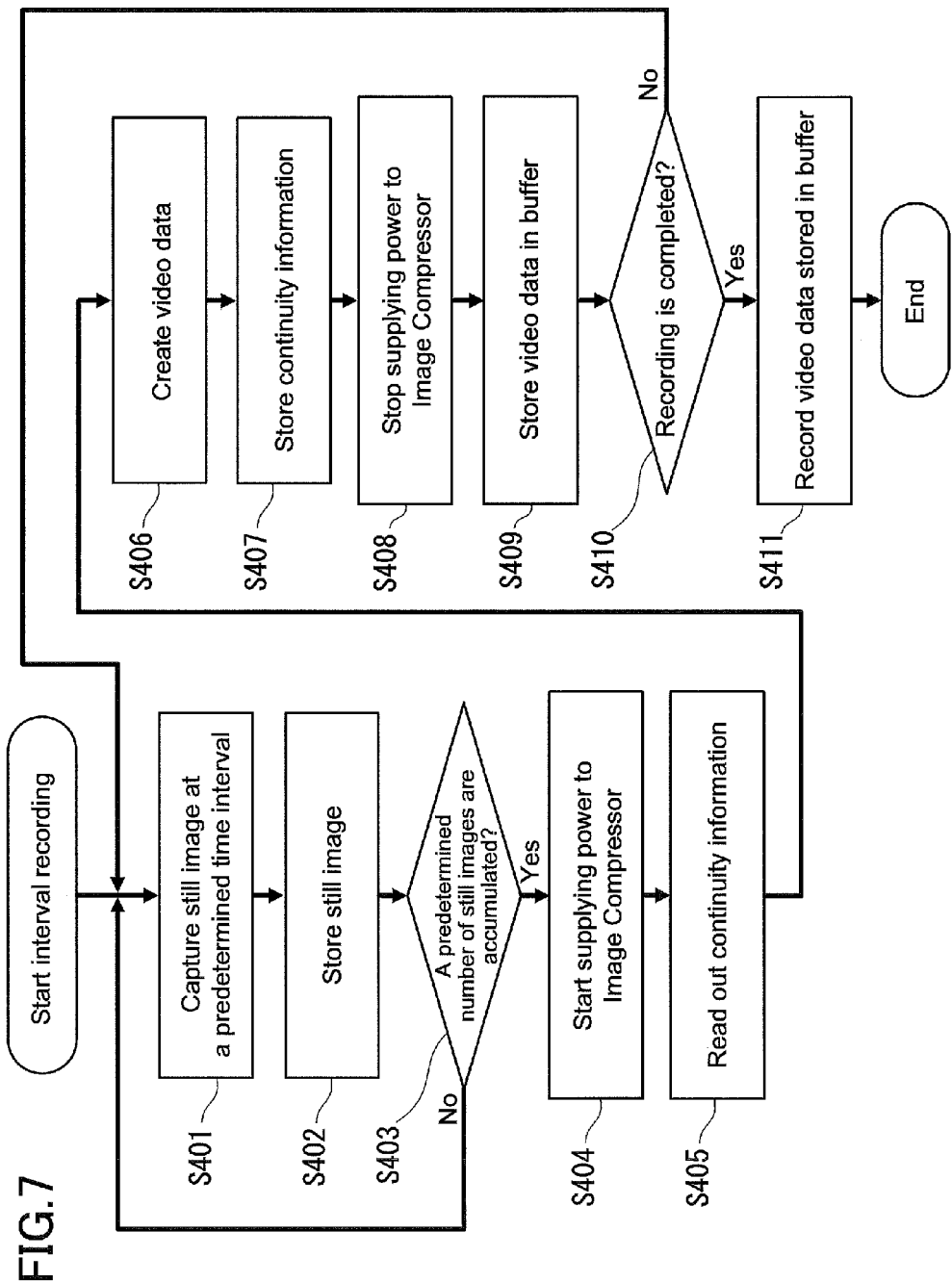
FIG. 7 is a flow chart of interval recording according to a second embodiment of the present invention.

As shown in FIG. 7, Steps S401 to S408 correspond respectively to Steps S201 to S208 in the first embodiment. As shown in Step S409, in the present embodiment, the controller 70 stores temporarily the video data created by the image compressor 42 in a free space of the buffer 71 (memory), instead of recording the video data in the memory card 80 every time it is created. In response to receiving a trigger to stop interval recording, the controller 70 creates an interval video data by using a plurality of video data stored in the buffer 71, and records the interval video data in the memory card 80 (Step S411).

That is, the controller 70 stores the created plurality of video data in the buffer 71 from the start of the interval recording until the end condition of the interval recording is satisfied. When the end condition of the interval recording is satisfied, the controller 70 merges all the video data in the buffer 71 to create a single interval video data. According to this method, the controller 70 does not need to access the memory card 80 every time the video data is created by the image compressor 42. Since the process of merging the plurality of video data needs to be performed only once, the load on the controller 70 can be reduced. The multiplexing to be performed by the system encoder 72 also needs to be performed only once. The data to be stored temporarily in the buffer 71 may be AV data including audio data and video data, as in the first embodiment.

Instead of in response to receiving a trigger to stop interval recording, in response to the size of the free space in the buffer 71, the process of merging the plurality of video data to create the interval video data may be performed. For example, when the size of the free space in the buffer 71 falls below a predetermined value, the interval video data may be created by using the plurality of video data stored in the buffer 71. In this way, the capacity shortage in the buffer 71 can be avoided and an interval video data of a size exceeding the capacity of the buffer 71 can be created.

(Third Embodiment)

Figure 8:
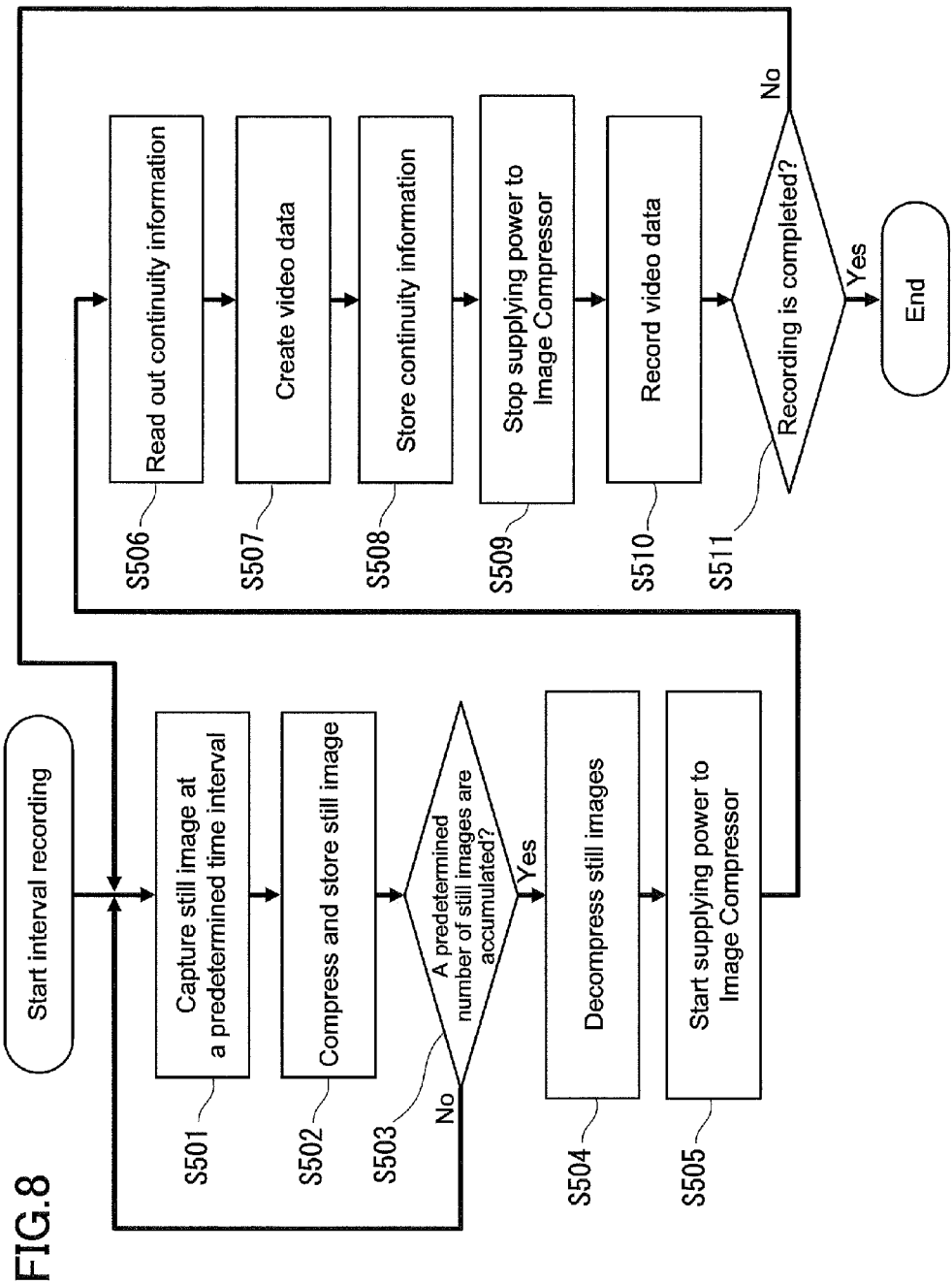
FIG. 8 is a flow chart of interval recording according to a third embodiment of the present invention.

In the present embodiment, when the still image data is stored in the buffer 71, the still image data is compressed once. As shown in FIG. 8, the controller 70 captures still image data, and then compresses the captured still image data and stores the compressed still image data in the buffer 71 (Step S501 and S502). Examples of still image data compression standards include JPEG and GIF.

Next, the controller 70 checks the number of time-series still image data accumulated in the buffer 71 (Step S503). When the predetermined number of still image data have been accumulated, the still image data is read out from the buffer 71 and decompressed (Step S504). The following Steps S505 to S511 correspond respectively to Steps S204 to S210 in the first embodiment.

According to the present embodiment, the controller 70 serves as: (i) a still image compression encoder that encodes the image data on a frame-by-frame basis so as to generate compressed still image data; and (ii) a still image decompression decoder that decodes the compressed still image data. The controller 70 stores the compressed still image data in the buffer 71, and after the resumption of the power supply, reads out the compressed still image data from the buffer 71 and decodes them so as to prepare, for the image compressor 42, decompressed still image data as the image data to be encoded. The capacity shortage of the buffer 71 can be avoided by storing the compressed still image data in the buffer 71.

(Fourth Embodiment)

Figure 9:
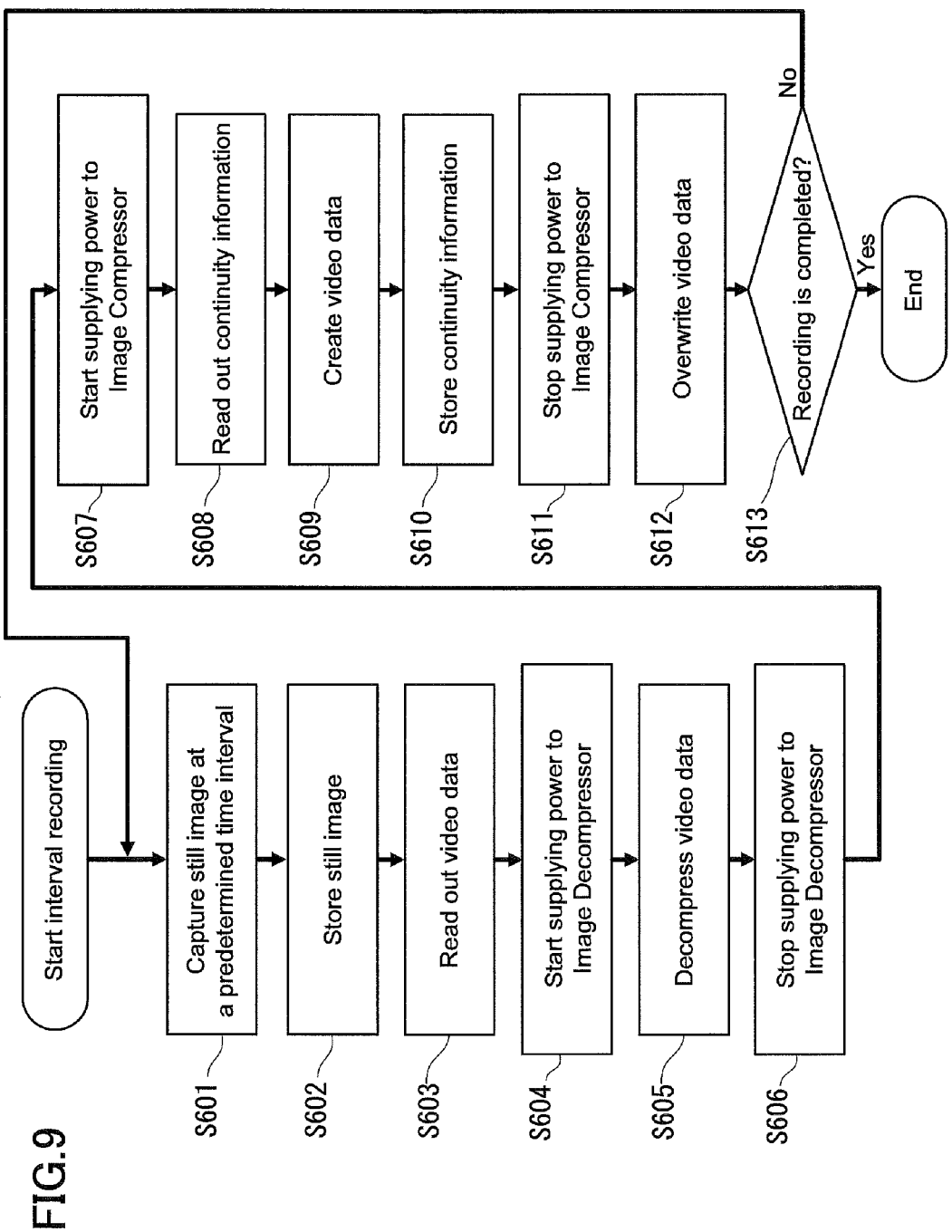
FIG. 9 is a flow chart of interval recording according to a fourth embodiment of the present invention.

As shown in FIG. 9, in the present embodiment, after capturing the still image data, the controller 70 checks whether or not the video data or the still image data that has been recorded in the memory card 80 after the resumption of the interval recording is present therein (Step S601). When neither the video data nor the still image data is present, the controller 70 stores the captured still image data in the memory card 80 (Step S602). Then, the controller 70 captures still image data again (Step S601). When the still image data is present, the controller 70 reads out the still image data from the memory card 80. Then, video data is created using the read-out still image data and newly captured still image data. After recording the created video data in the memory card 80, the controller 70 captures still image data again (Step S601).

On the other hand, when the video data is present, the controller 70 reads out the video data from the memory card 80 (Step S603).

Next, the controller 70 instructs the power supply control section 75 to start supplying power to the image decompressor 43. Upon receiving the instruction from the controller 70, the power supply control section 75 starts supplying power to the image decompressor 42 (Step S604). Then, the controller 70 instructs the image decompressor 43 to decompress the read-out video data (Step S605). After the decompression, the power supply to the image decompressor 43 is stopped (Step S606).

The processes performed in Steps S607 and S608 correspond respectively to those of Steps S204 and S205 in the first embodiment.

After the resumption of the power supply to the image compressor 42, the controller 70 instructs the image compressor 42 to create video data (Step S609). The image compressor 42 extracts, from the decompressed video data, a reference frame needed for an inter-frame encoding process, and adds the still image data captured in Step S602 to the resulting decompressed video data to create a new video data. That is, in the present embodiment, the captured still image data is added to the decompressed video data to create newly encoded video data.

Steps S610 and S611 correspond respectively to Steps S207 and S208 in the first embodiment.

After the power supply to the image compressor 42 is stopped, the controller 70 records the new video data in the memory card 80 (Step S612). The controller 70 may write the new video data over the video data read in Step S603. Thus, the size of the video data in the memory card 80 can be reduced. Furthermore, the controller 70 may record only newly generated differential data in the new video data in addition to the video data read in Step S603.

In the present embodiment, the buffer 71 functions as a memory capable of storing the still image data, and the memory card 80 functions as a memory capable of storing the video data generated by the image compressor 42. During the stop of the power supply to the image compressor 42, the controller 70 captures the image data in the form of still image data from the image pre-processor 41 at predetermined time intervals. In response to capturing the new still image data, the power supply to the image compressor 42 is resumed. In the case where after the resumption of power supply, previously created video data is present in the memory card 80, the previously created video data is decoded by the image decompressor 43, and an encoding process to create new video data by using the video data obtained by the decoding and the new still image data is performed by the image compressor 42. The new video data created by the image compressor 42 is re-recorded in the memory card 80.

According to the method of the present embodiment, every time still image data is captured, the still image data is used to create encoded video data. Therefore, in the case where the interval recording is interrupted for some reasons such as a dead battery, it is possible to prevent all of the still image data that have been captured up until that time from being lost, so that the video data obtained immediately before the interruption can be recorded in the memory card 80 without fail.

Also in the present embodiment, audio data as well as video data may be handled. In this case, AV data recorded in the memory card 80 is separated into audio data and video data by the system decoder 73, and the processes described in the present embodiment are performed on the video data thus separated.

INDUSTRIAL APPLICABILITY

The present invention is useful for an imaging apparatus having an interval recording function, for example, for a video camera.

The invention claimed is:

1. An imaging apparatus comprising:
   an image sensor configured to pick up an image of a subject;
   an image processor configured to process an output of the image sensor to generate processed image data;
   an encoder configured to encode the image data to create video data;
   a recording mode selector configured to set a recording mode of the imaging apparatus to an interval recording mode, in which a frequency at which the video data is created is lower than a frequency in an ordinary recording mode;
   a recorder configured to merge a plurality of the video data created by the encoder, and to record the merged video data as a single interval video data, in the interval recording mode;
   a power controller configured to stop supplying power to the encoder after a creating process of the video data is completed, and to resume supplying power to the encoder when a creating process of the next video data needs to be performed, in the interval recording mode; and
   a continuity information manager configured to manage continuity information during the stop of the power supply to the encoder, the continuity information being information to be used to allow the interval video data to constitute a stream that can be reproduced continuously, and being referred to by the encoder when the encoder creates the video data.

2. The imaging apparatus according to claim 1, wherein
   the encoder is configured to encode the image data while simulating a buffer occupancy level of a hypothetical decoder, which is a hypothetical model of a decoder buffer of the imaging apparatus or another reproducing apparatus, so as to create the video data capable of avoiding underflow of the decoder buffer during reproduction of the video data,
   the continuity information includes information for identifying the buffer occupancy level obtained at the completion of an immediately preceding encoding process, and the encoder refers to the continuity information after the resumption of the power supply so as to perform a new encoding process by using, as a reference, the buffer occupancy level obtained at the completion of an immediately preceding encoding process.

3. The imaging apparatus according to claim 1, wherein the power controller stops supplying clocks to a circuit block that constitutes the encoder so as to stop supplying power to the encoder.

4. The imaging apparatus according to claim 1, further comprising a memory capable of storing the image data generated by the image processor,
wherein during the stop of the power supply to the encoder, the recorder obtains the image data in the form of still image data from the image processor at a predetermined time interval and stores the obtained still image data temporarily in the memory, and instructs the power controller to resume supplying power to the encoder when a predetermined number of the time-series still image data are accumulated in the memory, and
after the power controller resumes supplying power, the encoder obtains, from the memory, the time-series still image data as the image data to be encoded, and encodes the obtained still image data so as to create the one unit of the video data.

5. The imaging apparatus according to claim 4, wherein the recorder stores temporarily the video data created by the encoder in the memory, and in response to receiving a trigger to stop interval recording, creates the interval video data by using the plurality of the video data stored in the memory.

6. The imaging apparatus according to claim 4, wherein
the recorder includes: (i) a still image compression encoder configured to encode the image data on a frame-by-frame basis so as to generate compressed still image data; and (ii) a still image decompression decoder configured to decode the compressed still image data, and
the recorder stores the compressed still image data in the memory, and decodes the compressed still image data after the resumption of the power supply so as to prepare, for the encoder, decompressed still image data as the image data to be encoded.

7. The imaging apparatus according to claim 4, wherein the memory includes a memory card that is removable from the imaging apparatus.

8. The imaging apparatus according to claim 1, wherein the continuity information further includes a time stamp for identifying a decoding time of a bit stream of the interval video data.

9. The imaging apparatus according to claim 1, wherein the encoder performs an encoding process according to MPEG-2 or H.264/AVC as a video compression standard.

10. The imaging apparatus according to claim 1, wherein the imaging apparatus is a video camera driven by a battery.

11. The imaging apparatus according to claim 1, further comprising:
a memory capable of storing the image data generated by the image processor and the video data created by the encoder; and
a decoder configured to decode the video data,
wherein during the stop of the power supply to the encoder, the recorder obtains the image data in the form of still image data from the image processor at a predetermined time interval,
in response to receiving new still image data, the power supply to the encoder is resumed,
in the case where previously created video data is present in the memory after the resumption of the power supply, the decoder decodes the previously created video data, and the encoder performs an encoding process to create new video data by using data obtained by the decoding and the new still image data, and
the new video data created by the encoder is re-recorded in the memory.

12. A video data creating method comprising:
picking up an image of a subject to generate image data;
encoding the image data to create video data;
merging a plurality of the video data created by an encoder configured to encode the image data, and recording the merged video data as a single interval video data, when an interval recording mode, in which a frequency at which the video data is created is lower than a frequency in an ordinary recording mode, is set as an operation mode of the encoder;
stopping supplying power to the encoder after a creating process of the video data is completed, in the interval recording mode;
resuming supplying power to the encoder when a creating process of the next video data needs to be performed, after the stop of the power supply to the encoder; and
managing continuity information during the stop of the power supply to the encoder, the continuity information being information to be used to allow the interval video data to constitute a stream that can be reproduced continuously, and being referred to by the encoder when the encoder creates the video data.

* * * * *